May 8, 1934.  T. MARTIN  1,957,466
VALVE MECHANISM
Filed May 23, 1932  2 Sheets-Sheet 2
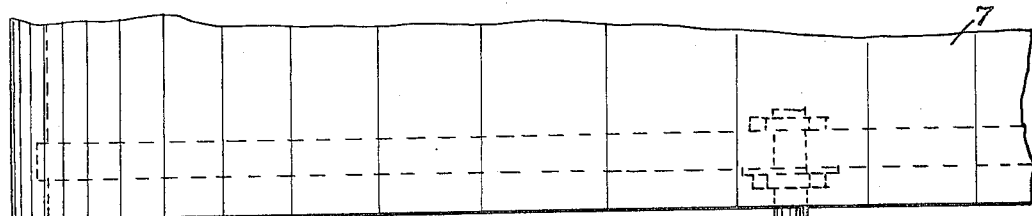
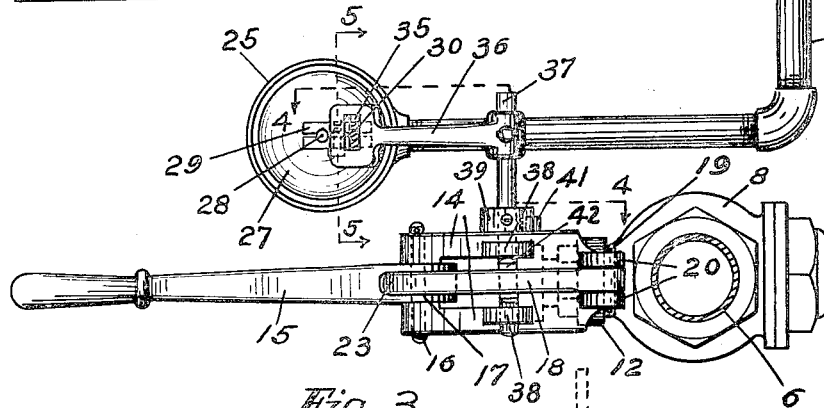
Fig. 3.
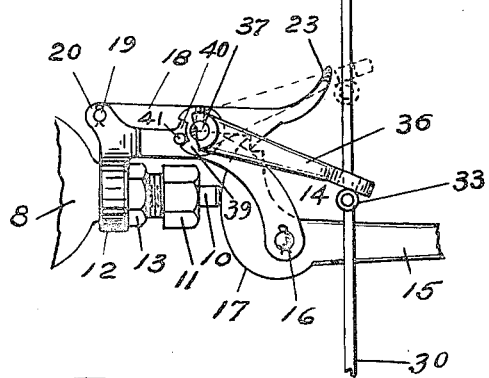
Fig. 4.
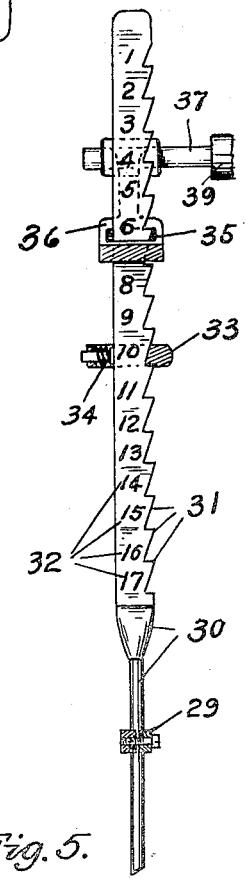
Fig. 5.
INVENTOR
THOMAS MARTIN
BY
ATTORNEY Patented May 8, 1934

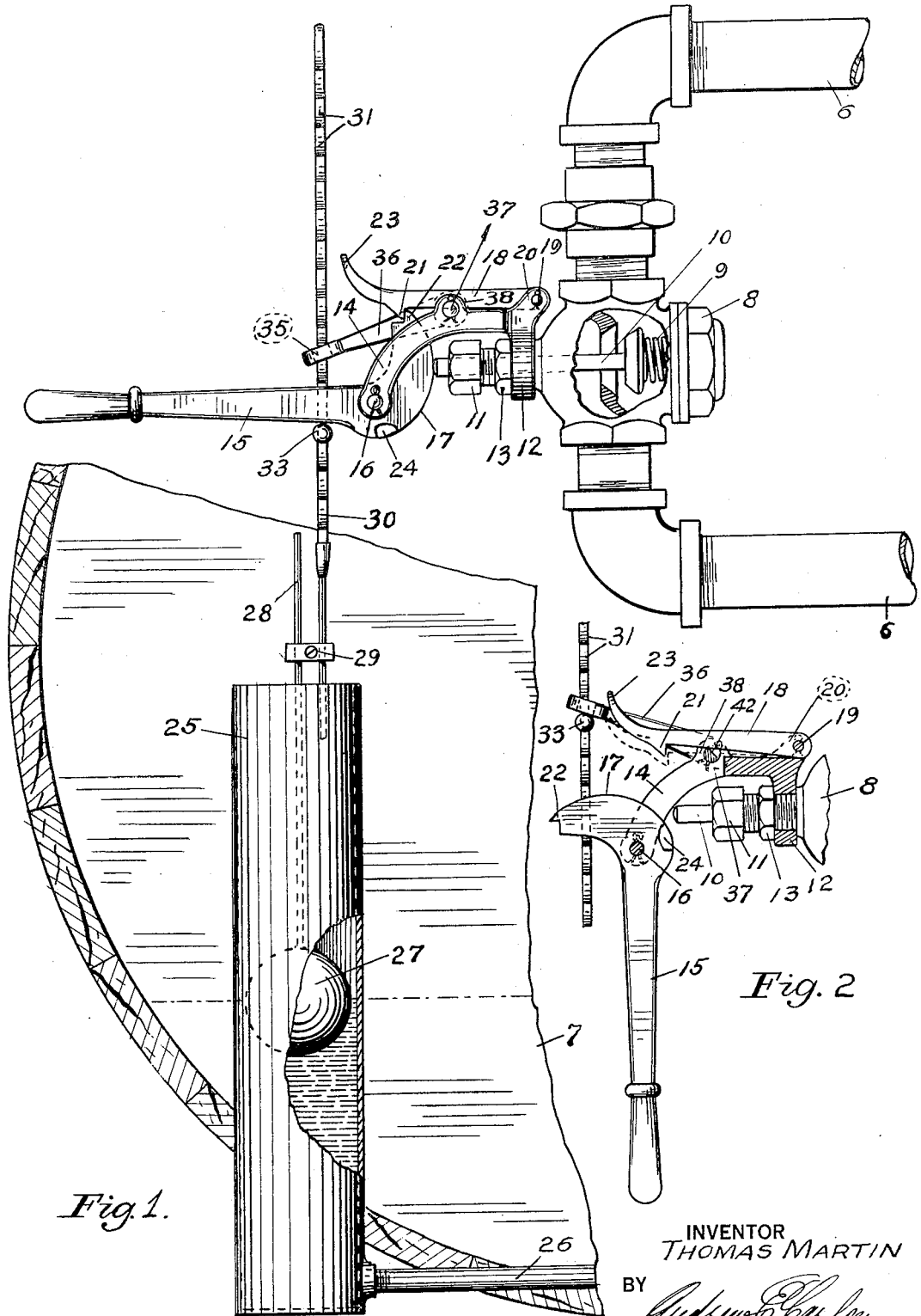

1,957,466

UNITED STATES PATENT OFFICE 1,957,466

VALVE MECHANISM

Thomas Martin, Minneapolis, Minn., assignor to Laundries Service Company, Minneapolis, Minn., a corporation of South Dakota Application May 23, 1932, Serial No. 612,977

2 Claims. (Cl. 137—68)

This invention relates to liquid level control apparatus and the primary object is to provide means of a novel, efficient, and practical nature for controlling the supply valves to large receptacles like wash drums such as used in laundries, although the invention is also applicable to other types and purposes of receptacles. More specifically the object is to provide the supply valve to such a receptacle with means for manually opening the same and releasably securing it open, with means controlled by the water in the receptacle for releasing and permitting the valve to close when such water reaches a predetermined level. These and other more detailed and specific objects will be disclosed in the course of the following specification, reference being had to the accompanying drawings, in which:

Fig. 1 is a side elevation of the apparatus with fractional parts broken away for purpose of illustration, and showing it in connection with the supply pipe and receptacle of a storage tank or other apparatus in connection with which the device may be used.

Fig. 2 is a detail elevation partly in section showing the actuator mechanism in a released position.

Fig. 3 is a top or plan view of the structure in Fig. 1.

Fig. 4 is a detail elevation partly in section as seen on the irregular line 4—4 in Fig. 3.

Fig. 5 is a detail elevation partly in section, as seen on the line 5—5 in Fig. 3.

Referring to the drawings more particularly and by reference characters, 6 designates a main supply pipe for a storage tank or receptacle indicated generally by the numeral 7. The supply line 6 is provided with a conventional type of valve 8 by which the flow of liquid through the pipe 6 to the receptacle 7 is controlled. The valve 8 is yieldingly closed under the action of a spring 9 and is adapted to be opened by an inward movement exerted upon the end of a valve stem 10, which valve stem operates through a packing gland 11.

A bracket member 12 is rigidly secured on the neck of the valve 8, by a nut 13, and has a pair of integral arms 14 between which a hand lever 15 is fulcrumed, as at 16. This lever has a cam edged surface 17, which, when the lever is raised to a horizontal position, engages the stem 10 to open the valve. The lever 15 is arranged to be releasably secured in its horizontal or valve opening position by a latch or dog 18 which is fulcrumed as at 19 to a pair of integral ears 20 of the bracket 12. The latch 18 has a tooth 21 for engagement with a tooth 22 of the lever 15, as shown in Fig. 1, and has an extension tongue 23 by which the latch may be manually disengaged from the hand lever when so desired. When the latch 18 is disengaged from the hand lever the latter is of course free to fall into its inactive vertical position, as shown in Fig. 2, at which time the valve 8 will instantly close under the action of spring 9. It is desirable to limit the released movement of the lever 15 by providing it with a lug 24 for engagement with one of the bracket arms 14.

The mechanism for automatically closing the valve 8, when the liquid in the receptacle 7 reaches a predetermined level, cooperates with the apparatus thus far described and will be referred to in detail as follows:

An elongated and preferably cylindrical float chamber 25 is arranged adjacent the receptacle 7 and communicates with the same through a pipe 26, with a result that the liquid level in both receptacles will of course be substantially the same at all times. A float 27 is vertically movable in the chamber 25 and has a vertical stem or rod 28 which is rigidly but adjustably secured, as at 29, to a gauge bar 30. This bar is flattened over its major portion, as shown, and one edge is toothed as at 31. The teeth 31 are preferably proportioned to correspond to one inch depth measurements in the receptacle 7, and for convenience the bar is further provided with indices 32 so that settings and readings can properly be made.

A small block or actuator 33 is slidably mounted on the bar 30 but is normally held in engagement with one of the teeth 31 by a spring 34. To slide or move the actuator 33 on the rod it is necessary to first move it laterally out of engagement with the teeth 31, and against the resistance of the spring 34; and when released, after vertical movement, will of course immediately reengage another tooth 31 to thereby hold it in the desired adjusted position.

The rod 30 is vertically slidable in a rectangular hole 35 in the outer end of an arm 36 of a shaft 37 that is journaled in a pair of bearing lugs 38 of the bracket arms 14. The shaft 37 has a collar 39 with a segmented slot or recess 40, into which projects a pin 41 fixed in the adjacent bracket arm 14, the purpose of which is to limit the up and down movement of the arm 36, and thus prevent any possible binding action of the rod 30 in the hole 35.

The shaft 37 is provided, between the lugs 38, with a flattened portion or surface 42 which is normally in a horizontal position when the arm 36 is in its lower position, and when in this position the surface 42 permits the latch lever 18 to move to a sufficiently low position so that the teeth 21 and 22 may be interlocked. When the shaft 37 is partially rotated, however, it will lift the lever 18, as indicated in Fig. 2, to disengage the tooth 21 and release the hand lever 15 to permit closing of the valve 8 by the spring 9.

The use and operation of the device, while possibly evident from the foregoing description, may be described as follows:

When the tank or other receptacle 7 is to be partially filled with liquid from the pipe line 6, the member 33 is first adjusted on the gauge bar 30 to correspond with the depth of liquid desired for the receptacle 7. In various types of washing machine receptacles for which the present invention is particularly designed, the depth or volume of water for the washing tank will ordinarily vary from five or six inches up to fifteen or sixteen inches, depending upon the size and type of tank as well as the volume and character of material to be washed. In any event an experienced operator will know the amount of water required and can set the member 33 accordingly.

After this is done he then lifts up the hand lever 15, thus opening the valve 8 through the action of the cam surface 17 on the valve stem 10, and as the lever 15 reaches its horizontal position it will be releasably secured by the latch lever 18, as shown in Fig. 1. The valve is now open and the water is running into the receptacle 7. As the level of the liquid rises in the receptacle 7 it will also of course rise in the float chamber 25, thus elevating the float 27 and the bars 28 and 30. As the actuator 33 now comes in contact with the arm 36 it raises the latter and rotates the shaft 37 so that the latch 18 will be raised from the flat surface 42 to the peripheral surface of the shaft 37, thus releasing the tooth 21 of the latch lever 18 from the tooth 22 of the hand lever 15, which in turn results in the closing of the valve 8 until the receptacle 7 is again to be supplied.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A control mechanism for a valve having a spring projected valve stem adapted upon being depressed to open the valve, comprising a bracket frame having an integral collar for mounting upon the neck of the valve and a bifurcated portion extending beyond the valve stem, a manually actuated cam oscillatably mounted in said bifurcated bracket portion for end contact with the valve stem, a latch lever fulcrumed in the frame for releasable engagement with the cam, a shaft journaled in the frame adjacent the latch lever, and having means for actuating the same to disengage it from the cam when the shaft is turned, a crank arm extending from the shaft and having an aperture to movably receive a rod member of a liquid level responsive mechanism.

2. An attachment for a valve having a spring projected valve stem adapted upon being depressed to open the valve, comprising a frame rigid with respect to the valve, a cam mounted in the frame for acting on the valve stem, a latch for releasably securing the cam in engagement with the stem, a shaft having a flat surface adjacent the latch for contacting therewith, when the shaft is turned, to release the latch from the cam to thus permit closing of the valve, and a liquid level responsive mechanism for rotating the shaft.

THOMAS MARTIN.